United States Patent
Maheshwari et al.

(10) Patent No.: US 10,085,208 B2
(45) Date of Patent: Sep. 25, 2018

(54) SMART POWER SAVING SCHEME FOR LTE ADVANCED

(71) Applicant: QUALCOMM Incorporated, San Diego, CA (US)

(72) Inventors: Ankit Maheshwari, Hyderabad (IN); Atul Soni, Hyderabad (IN); Akash Kumar, Hyderabad (IN)

(73) Assignee: Qualcomm Incorporated, San Diego, CA (US)

(*) Notice: Subject to any disclaimer, the term of this patent is extended or adjusted under 35 U.S.C. 154(b) by 116 days.

(21) Appl. No.: 15/250,414

(22) Filed: Aug. 29, 2016

(65) Prior Publication Data

US 2018/0063783 A1 Mar. 1, 2018

(51) Int. Cl.
| | |
|---|---|
| H04W 52/02 | (2009.01) |
| H04L 5/14 | (2006.01) |
| H04W 76/04 | (2009.01) |
| H04W 72/12 | (2009.01) |
| H04W 76/28 | (2018.01) |

(52) U.S. Cl.
CPC ........ *H04W 52/0212* (2013.01); *H04L 5/14* (2013.01); *H04W 52/0216* (2013.01); *H04W 52/0229* (2013.01); *H04W 52/0261* (2013.01); *H04W 72/1268* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 8,451,150 B2 | 5/2013 | Chou | |
| 8,885,690 B2 | 11/2014 | Zolfaghari et al. | |
| 9,374,786 B1 | 6/2016 | Maheshwari et al. | |
| 9,769,771 B2* | 9/2017 | Nogami | H04W 72/04 |
| 2012/0184327 A1* | 7/2012 | Love | H04B 1/0064 455/552.1 |
| 2013/0089044 A1* | 4/2013 | Park | H04W 52/146 370/329 |
| 2014/0153461 A1* | 6/2014 | Lorenz | H04W 52/0245 370/311 |
| 2014/0155116 A1* | 6/2014 | Dakshinamurthy | H04W 52/0251 455/522 |

(Continued)

FOREIGN PATENT DOCUMENTS

WO WO-2016133614 A1 8/2016

OTHER PUBLICATIONS

International Search Report and Written Opinion—PCT/US2017/046785—ISA/EPO—dated Oct. 30, 2017.

*Primary Examiner* — Candal Elpenord
(74) *Attorney, Agent, or Firm* — Patterson & Sheridan, L.L.P.

(57) ABSTRACT

Certain aspects of the present disclosure provide techniques for smart power saving at a user equipment (UE), comprising a first and second transmit chain. According to aspects, the UE may identify one or more subframes in which the second transmit chain is not scheduled for uplink (UL) transmissions, determine the first transmit chain is scheduled for UL transmissions during at least a portion of the identified subframes, and perform envelope tracking (ET) for a scheduled uplink transmission using, at least portions of the first and second transmit chains during the determined at least a portion of the identified subframes.

30 Claims, 12 Drawing Sheets

(56) References Cited

U.S. PATENT DOCUMENTS

| | | | |
|---|---|---|---|
| 2014/0155117 A1* | 6/2014 | Xia | H04W 52/54 455/522 |
| 2014/0269986 A1 | 9/2014 | Nagode et al. | |
| 2015/0017931 A1* | 1/2015 | Devison | H03F 1/0227 455/95 |
| 2015/0280795 A1 | 10/2015 | Wimpenny et al. | |
| 2015/0289266 A1 | 10/2015 | Hsu et al. | |
| 2016/0088571 A1* | 3/2016 | Choi | H04L 5/0048 370/329 |
| 2016/0099732 A1 | 4/2016 | Petrovic et al. | |
| 2016/0150490 A1* | 5/2016 | Ouchi | H04W 72/12 455/522 |

* cited by examiner

SMART POWER SAVING SCHEME FOR LTE ADVANCED

INTRODUCTION

Aspects of the present disclosure relate to wireless communications systems and, more particularly, power saving schemes for a user equipment (UE) in a wireless communication network.

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology), 4G, 5G, or later system, which may provide network service via any one of various radio access technologies (RATs) including EVDO (Evolution-Data Optimized), 1xRTT (1 times Radio Transmission Technology, or simply 1x), W-CDMA (Wideband Code Division Multiple Access), UMTS-TDD (Universal Mobile Telecommunications System-Time Division Duplexing), HSPA (High Speed Packet Access), GPRS (General Packet Radio Service), or EDGE (Enhanced Data rates for Global Evolution). Such multiple access networks may also include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, 3rd Generation Partnership Project (3GPP) Long Term Evolution (LTE) networks, and Long Term Evolution Advanced (LTE-A) networks. Other examples of wireless communication networks may include WiFi (in accordance with IEEE 802.11), WiMAX (in accordance with IEEE 802.16), and Bluetooth® networks.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station.

Amplifiers (e.g., transimpedance amplifiers, inverting amplifiers, etc.) may be used in a variety of systems to increase the power of an input signal, such as in wireless communication systems utilizing radio frequency (RF) signals. For example, amplifiers may be used in wireless communication systems to increase the power of an RF signal for transmission, or increase the power of a received RF signal. RF front ends in such systems may implement envelope tracking, which is an approach to amplifier design where the power supply voltage to the amplifier is adjusted to track the instant transmission power demanded for transmitting a dynamic signal. Accordingly, the amplifier may operate efficiently according to the varying power level.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for opportunistically performing envelope tracking by a UE are provided herein. According to aspects, the UE may communicate via a single subscription using two or more transmit chains. According to aspects, at least two of the transmit chains may each have respective transmit logic, such as a digital-to-analog (DAC) converter. As will be described in more detail herein, in certain scenarios, the UE may opportunistically use two DACs to perform envelope tracking uplink transmissions.

In an aspect, a method for wireless communication by a user equipment (UE) comprising at least a first and second transmit chain is provided. The UE may identify one or more subframes in which the second transmit chain is not scheduled for uplink transmissions, determine the first transmit chain is scheduled for UL transmissions during at least a portion of the identified subframes, and perform envelope tracking (ET) for a scheduled uplink transmission using, at least, a portion of the first and second transmit chains during the determined at least a portion of the identified subframes.

In an aspect, an apparatus for wireless communication by a user equipment (UE) comprising at least a first and second transmit chain is provided. The apparatus may include means for identifying one or more subframes in which the second transmit chain is not scheduled for uplink transmissions, means for determining the first transmit chain is scheduled for UL transmissions during at least a portion of the identified subframes, and means for performing envelope tracking (ET) for a scheduled uplink transmission using, at least, a portion of the first and second transmit chains during the determined at least a portion of the identified subframes.

In an aspect, an apparatus for wireless communication by a user equipment (UE) comprising at least a first and second transmit chain is provided. The apparatus includes at least one processor and a memory coupled to the at least one processor. The at least one processor may be configured to identify one or more subframes in which the second transmit chain is not scheduled for uplink transmissions, determine the first transmit chain is scheduled for UL transmissions during at least a portion of the identified subframes, and perform envelope tracking (ET) for a scheduled uplink transmission using, at least, a portion of the first and second transmit chains during the determined at least a portion of the identified subframes.

In an aspect, a computer readable medium storing computer executable code for a user equipment (UE) comprising at least a first and second transmit chain is provided. The code may cause the UE to identify one or more subframes in which the second transmit chain is not scheduled for uplink transmissions, determine the first transmit chain is scheduled for UL transmissions during at least a portion of the identified subframes, and perform envelope tracking (ET) for a scheduled uplink transmission using, at least, a portion of the first and second transmit chains during the determined at least a portion of the identified subframes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 3:
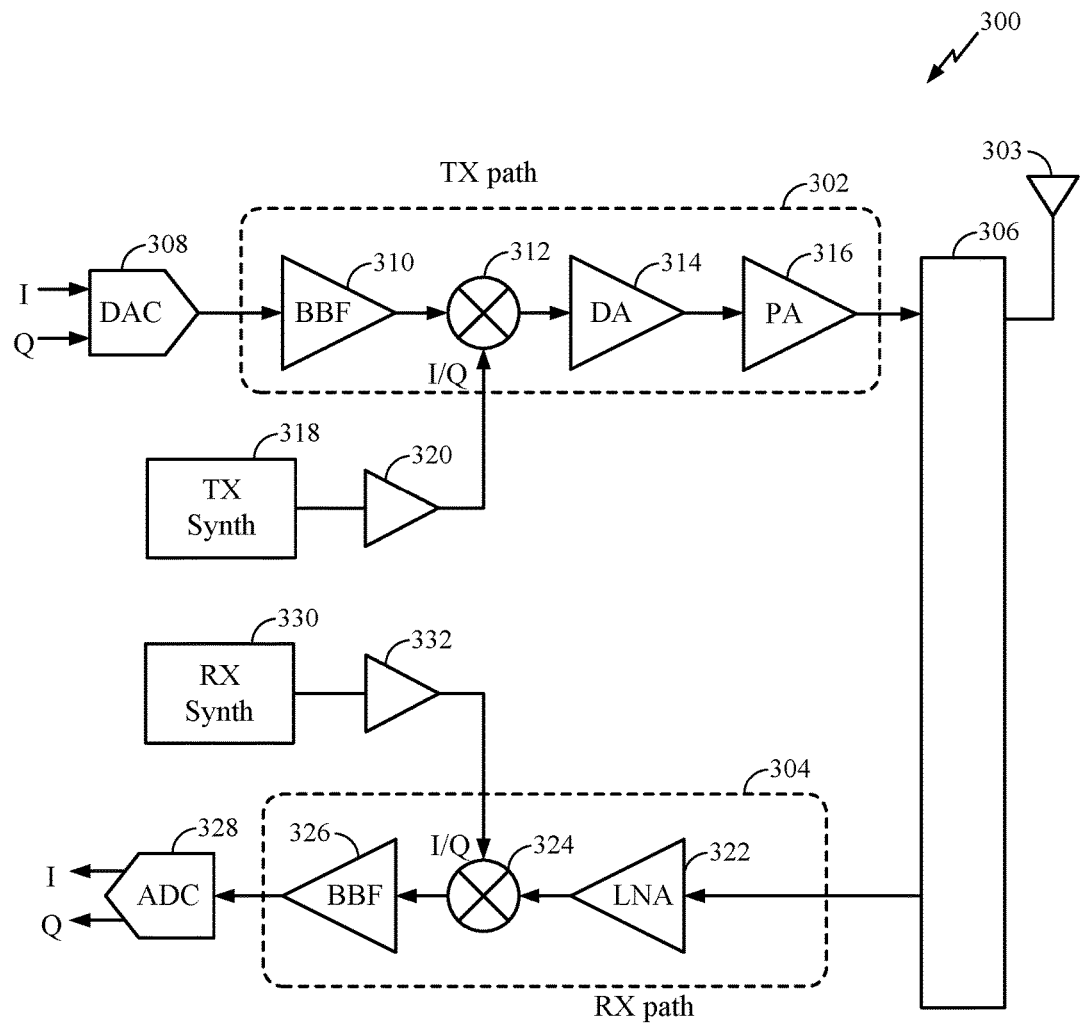
FIG. 3 is a block diagram of an example transceiver front end, in accordance with certain aspects of the present disclosure.

Aspects of the present disclosure provide apparatus, methods, processing systems, and computer readable mediums for smart power saving at a UE. A UE 120 may be configured to communicate via a single subscription using two or more transmit chains. A transmit chain may include one or more components as illustrated in TX path 302 in FIG. 3. For example, the UE 120 may have a two TX chains $302_1$, $302_2$ each including one or more components as illustrated in FIG. 3. According to aspects, each TX chain may include separate DAC logic. For example, the UE 120 may have a first DAC associated with a first transmit chain and a second DAC associated with a second transmit chain. The UE may be configured to opportunistically use both DACs to perform envelope tracking (ET) uplink transmissions in certain scenarios.

For example, a UE 120 may identify subframe(s) in which one of the transmit chains, for example, a second transmit chain is not scheduled for UL transmissions. The UE may determine a transmit chain, for example, a first transmit chain is scheduled for UL transmission during, at least, a portion of the subframe(s) in which the second transmit chain is not scheduled for UL transmissions.

In response, the UE may repurpose a DAC (e.g., a transmit DAC) associated with the second transmit chain in an effort to perform ET uplink transmissions during a portion of the determined subframes (e.g., during at least a portion of the subframes in which the second transmit chain is not scheduled for UL transmissions and the first transmit chain is scheduled for UL transmissions). In this manner, the UE may use at least a portion of the second transmit chain (e.g., DAC logic) and the first transmit chain to perform ET for scheduled UL transmission.

As will be described in more detail herein, the repurposed DAC logic (e.g., from the second transmit chain) may be used as or serve as an ET DAC by the UE for a scheduled UL transmission (e.g., using the first transmit chain).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

Figure 1:
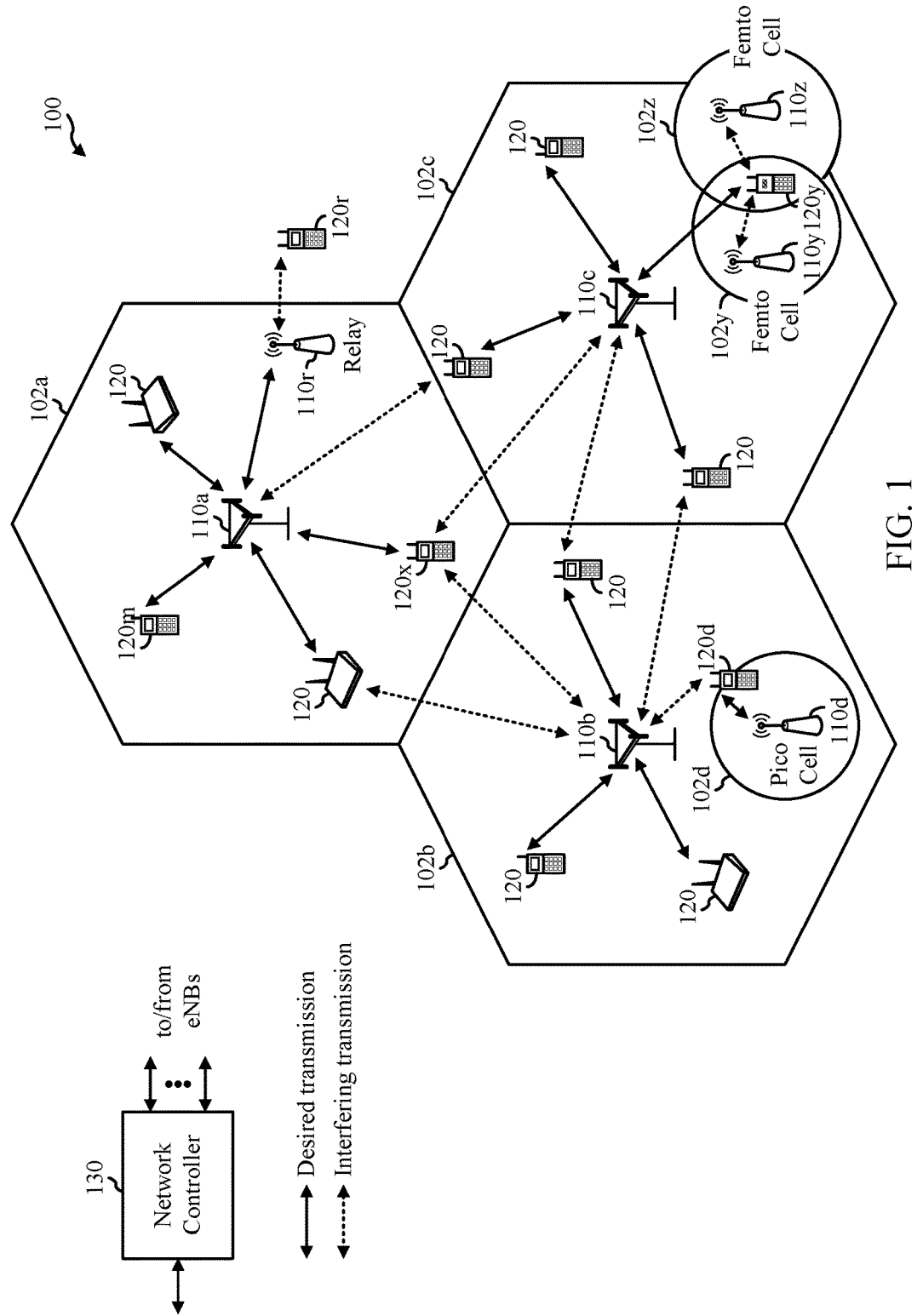
FIG. 1 is a block diagram conceptually illustrating an example telecommunications system, according to aspects of the present disclosure.

FIG. 1 illustrates an example wireless network 100 in which aspects of the present disclosure may be performed. The UEs 120 and BSs 110 may operate in the wireless network 100. The UEs 120 may be configured to perform aspects discussed in more detailed herein for smart power saving. The UE 120 may include, for example, at least two transmit chains. At least two of the transmit chains may include logic (e.g., transmit logic), such as for example, DAC logic and corresponding hardware. An example of a transmit chain is described, for example, with reference to FIG. 2, FIG. 3, and FIG. 7.

According to aspects, the UE may opportunistically use transmit logic associated with a transmit chain not scheduled for UL transmissions for performing ET on a transmit chain that is scheduled for UL transmissions. In this manner, a UE may opportunistically increase power savings while maintaining a low footprint and bill of material cost.

The system illustrated in FIG. 1 may be, for example, a long term evolution (LTE) network. The wireless network 100 may include a number of BS 110 and other network entities. A Node B may be a station that communicates with the UEs and may also be referred to as an eNodeBs, evolved Node B (eNBs), 5G Node B, transmission reception point (TRP), access point (AP), radio head, etc.

Each Node B 110 may provide communication coverage for a particular geographic area. In 3GPP, the term "cell" can refer to a coverage area of a Node B and/or an Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110d may be macro Node Bs for the macro cells 102a, 102b and 102d, respectively. The Node B 110d may be a pico Node B for a pico cell 102d. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120d, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, and/or any other BS, AP, TRP, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
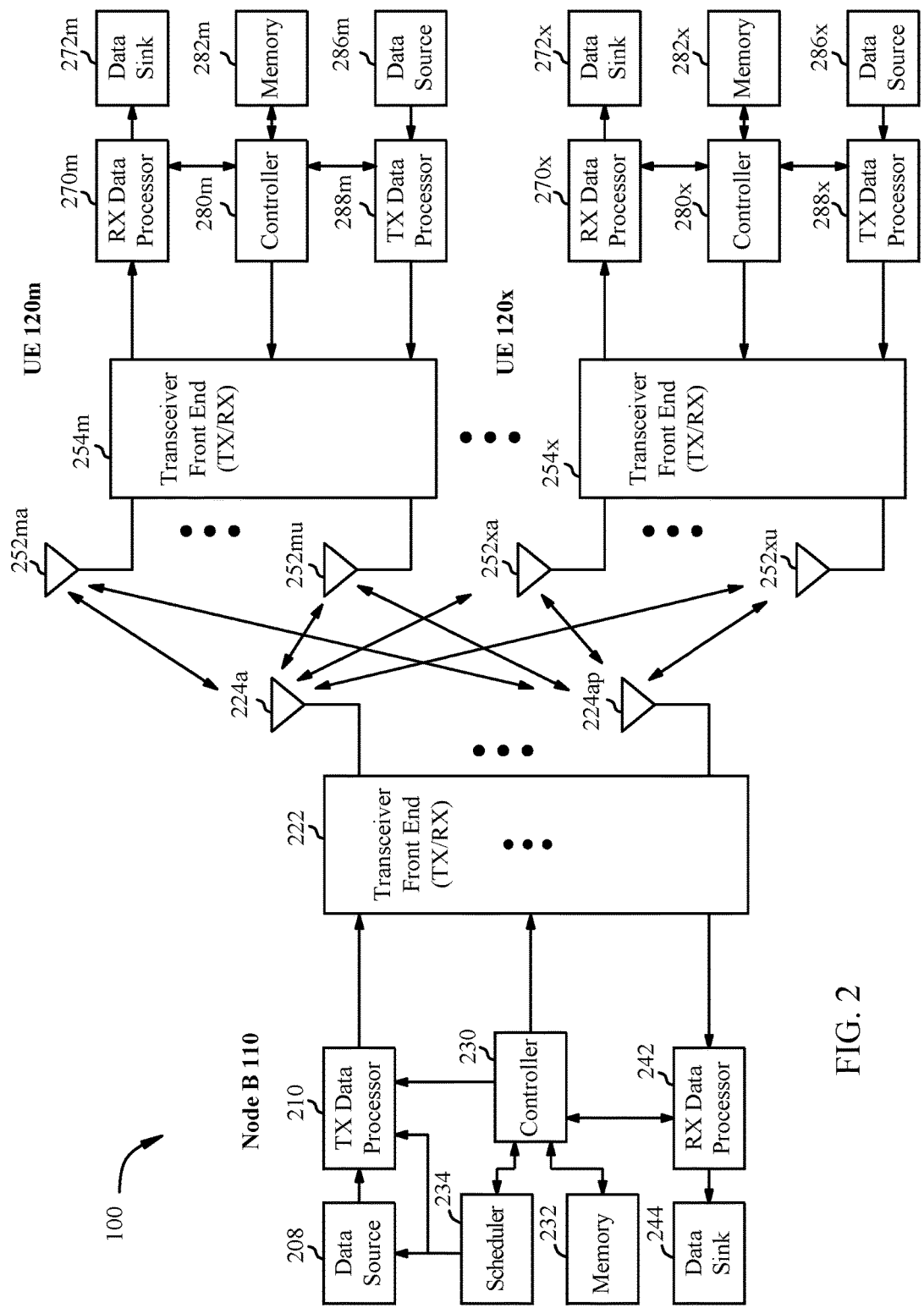
FIG. 2 is a block diagram of an example Node B and example UEs, in accordance with certain aspects of the present disclosure.

FIG. 2 shows a block diagram of Node B 110 and two UEs 120m and 120x in wireless system 100. Node B 110 is equipped with $N_{ap}$ antennas 224a through 224ap. UE 120m is equipped with $N_{ut,m}$ antennas 252ma through 252mu, and UE 120x is equipped with $N_{ut,x}$ antennas 252xa through 252xu. Node B 110 is a transmitting entity for the downlink and a receiving entity for the uplink. Each UE 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ UEs are selected for simultaneous transmission on the uplink, $N_{dn}$ UE are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the Node B and UE.

On the uplink, at each UE 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the UE based on the coding and modulation schemes associated with the rate selected for the UE and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the UE 120 and may interface with the controller 280.

A number $N_{up}$ of UEs 120 may be scheduled for simultaneous transmission on the uplink. Each of these UEs transmits its set of processed symbol streams on the uplink to the Node B.

At Node B 110, $N_{ap}$ antennas 224a through 224ap receive the uplink signals from all $N_{up}$ UEs transmitting on the uplink. For receive diversity, a transceiver front end 222 may select signals received from one of the antennas 224 for processing. The signals received from multiple antennas 224 may be combined for enhanced receive diversity. The Node B's transceiver front end 222 also performs processing complementary to that performed by the UEs's transceiver front end 254 and provides a recovered uplink data symbol stream. The recovered uplink data symbol stream is an estimate of a data symbol stream $\{s_{up}\}$ transmitted by a UE. An RX data processor 242 processes (e.g., demodulates, deinterleaves, and decodes) the recovered uplink data symbol stream in accordance with the rate used for that stream to obtain decoded data. The decoded data for each UE may be provided to a data sink 244 for storage and/or a controller 230 for further processing.

On the downlink, at Node B 110, a TX data processor 210 receives traffic data from a data source 208 for $N_{dn}$ UE scheduled for downlink transmission, control data from a controller 230 and possibly other data from a scheduler 234. The various types of data may be sent on different transport channels. TX data processor 210 processes (e.g., encodes, interleaves, and modulates) the traffic data for each UE based on the rate selected for that UE. TX data processor 210 may provide a downlink data symbol stream for one or more of the $N_{dn}$ UEs to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the Node B 110 and may interface with the controller 230.

At each UE 120, $N_{ut,m}$ antennas 252 receive the downlink signals from Node B 110. For receive diversity at the UE 120, the transceiver front end 254 may select signals received from one of the antennas 252 for processing. The signals received from multiple antennas 252 may be combined for enhanced receive diversity. The UE's transceiver front end 254 also performs processing complementary to that performed by the Node B's transceiver front end 222 and provides a recovered downlink data symbol stream. An RX data processor 270 processes (e.g., demodulates, deinterleaves, and decodes) the recovered downlink data symbol stream to obtain decoded data for the UE.

Figure 11:
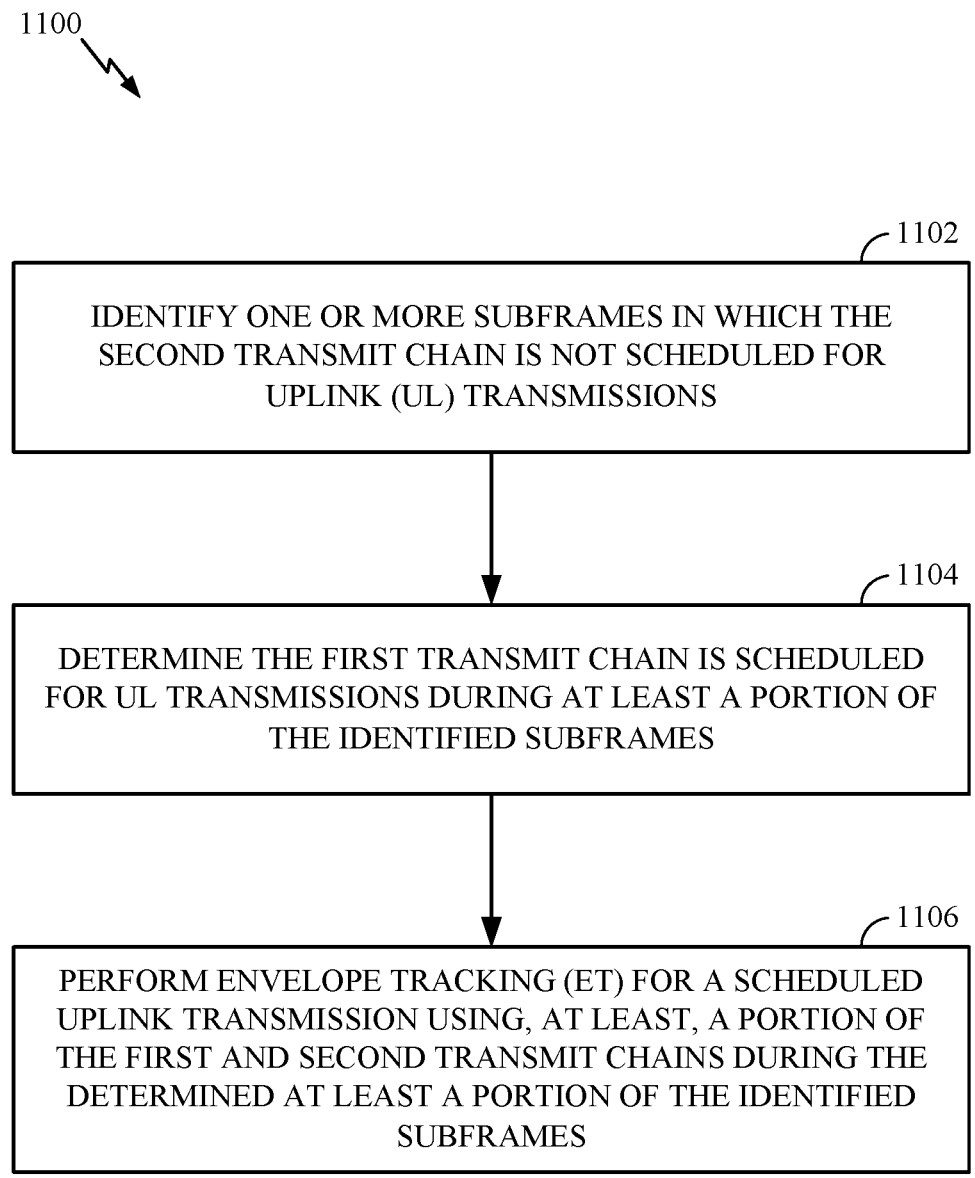
FIG. 11 illustrates example operations, which may be performed by a UE according to aspects of the present disclosure.

One or more modules of UE 120 illustrated in FIG. 2 may be configured to perform the operations described herein. For example, the antenna 252, transceiver front end 254, controller 280, and/or memory 282 may be configured to perform the operations 1100 as illustrated in FIG. 11, may be configured to operate in accordance with the scenarios illustrated in FIGS. 12-14, and in accordance with the features described herein.

Those skilled in the art will recognize the techniques described herein may be generally applied in systems utilizing any type of multiple access schemes, such as TDMA, SDMA, Orthogonal Frequency Division Multiple Access (OFDMA), CDMA, SC-FDMA, TD-SCDMA, and combinations thereof.

FIG. 3 is a block diagram of an example transceiver front end 300, such as transceiver front end 254 in FIG. 2, in which aspects of the present disclosure may be practiced. The UE 120 illustrated in FIG. 1 and FIG. 2 may include multiple transmit paths 302 and/or multiple receive paths 304. According to aspects, two or more of the transmit paths may each include logic (e.g., transmit logic), such as, for example DAC logic. Thus, two or more transmit chains 302 may include a respective DAC 308.

The transceiver front end 300 includes a transmit (TX) path 302 (e.g., also known as a transmit chain) for transmitting signals via one or more antennas and a receive (RX) path 304 (e.g., also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like.

As described above, the TX path 302 may also include the logic (e.g., transmit logic), such as a DAC 308.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which are amplified by the DA 314 and by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies indicates using a variable-frequency oscillator, which involves compromises between stability and tunability. Contemporary systems may employ frequency synthesizers with a voltage-controlled oscillator (VCO) to generate a stable, tunable LO with a particular tuning range. Thus, the transmit LO may be produced by a TX frequency synthesizer 318, whose output may be buffered or amplified by amplifier 320 before being mixed with the baseband signals in the mixer 312. Similarly, the receive LO may be produced by an RX frequency synthesizer 330, whose output may be buffered or amplified by amplifier 332 before being mixed with the RF signals in the mixer 324.

In some aspects, the power supply for the PA 316 may comprise an envelope tracking power supply, in accordance with certain aspects of the present disclosure. The envelope tracking power supply may be configured to adjust the power supplied to the PA 316, where the voltage of the modulated power supply for the PA 316 tracks (or is otherwise based on) the envelope (e.g., envelope waveform) of the signal to be amplified by the PA 316, as described in more detail below.

Figure 4:
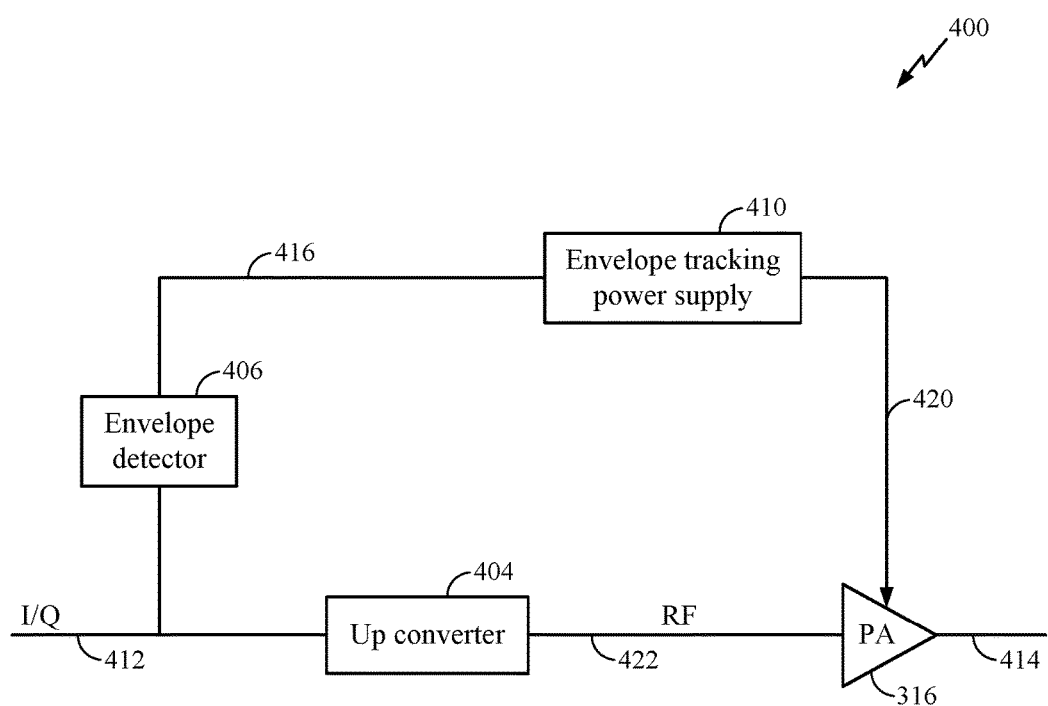
FIG. 4 is a block diagram of an example envelope tracking amplification system, in accordance with certain aspects of the present disclosure.

FIG. 4 illustrates an example envelope tracking amplification system 400, in which aspects of the present disclosure may be practiced. The envelope tracking amplification system 400 may include a PA 316, an up-converter 404, an envelope detector 406, and an envelope tracking power supply 410. As illustrated, the PA 316 may be configured to amplify an input signal 412 (or a signal based on the input signal). The input signal 412 may represent an in-phase (I) and/or quadrature (Q) signal. In some cases, the input signal 412 may be upconverted to an RF input signal 422 by the up-converter 404 before being amplified by the PA 316.

The input signal 412 is also used as an input to the envelope detector 406, which generates an envelope signal representing the envelope of the input signal 412 at its output 416 (e.g., provides a signal representing the magnitude of the input signal 412). The output 416 of the envelope detector 406 provides an input to the envelope tracking power supply 410, which in dependence thereon provides a supply voltage 420 to the PA 316. In this manner, the supply voltage 420 of the PA is adjusted based on (e.g., tracks) the envelope of the input signal 412. The PA 316 amplifies the input signal 412 or the RF input signal 422 to generate an amplified output signal 414 for transmission by an antenna, for example. The PA 316 may be implemented as a single stage or multi-stage amplifier.

Figure 5:
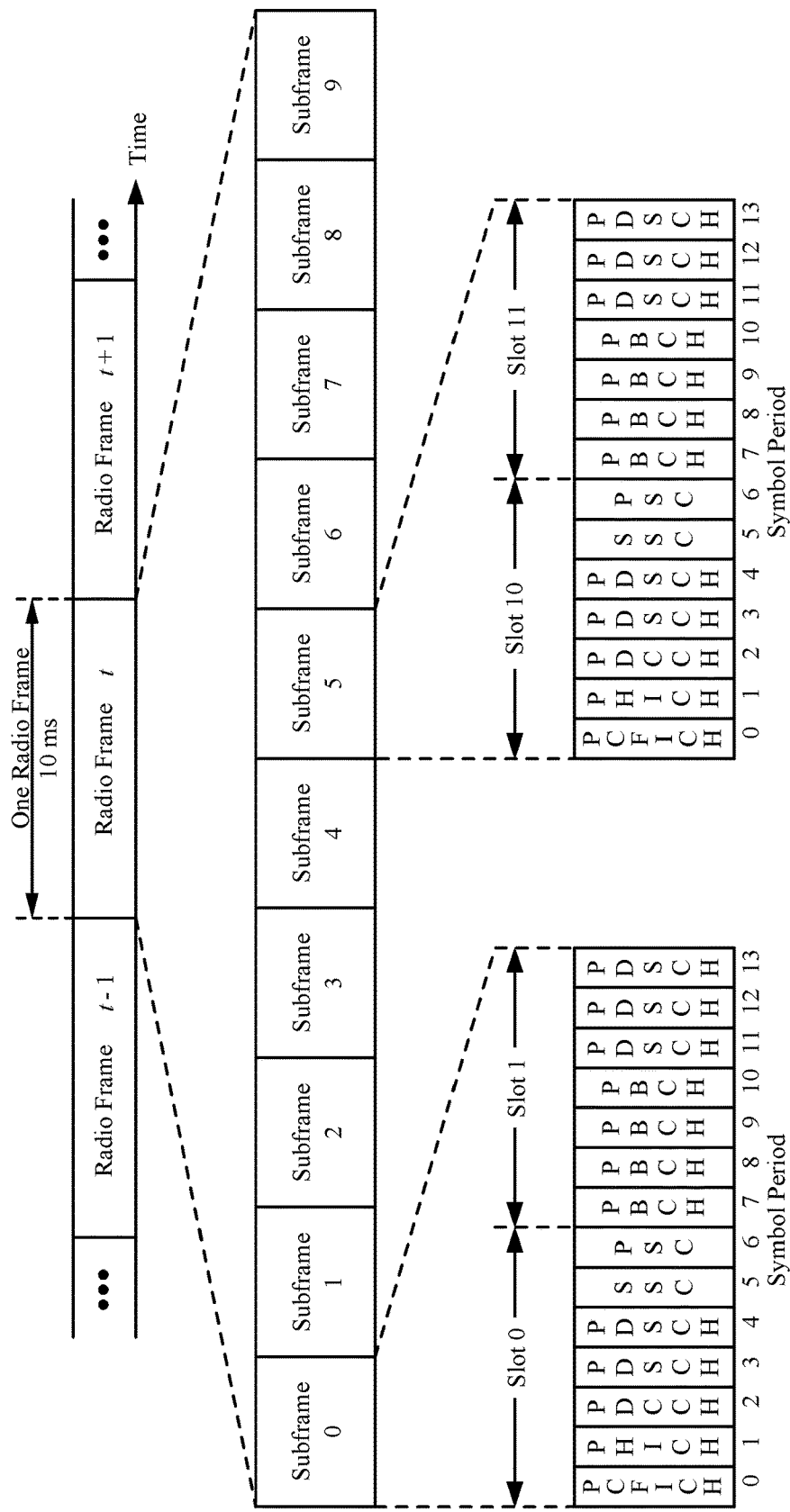
FIG. 5 is a block diagram conceptually illustrating an example downlink frame structure in a telecommunications system, according to aspects of the present disclosure.

FIG. 5 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 5. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, for example, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 6:
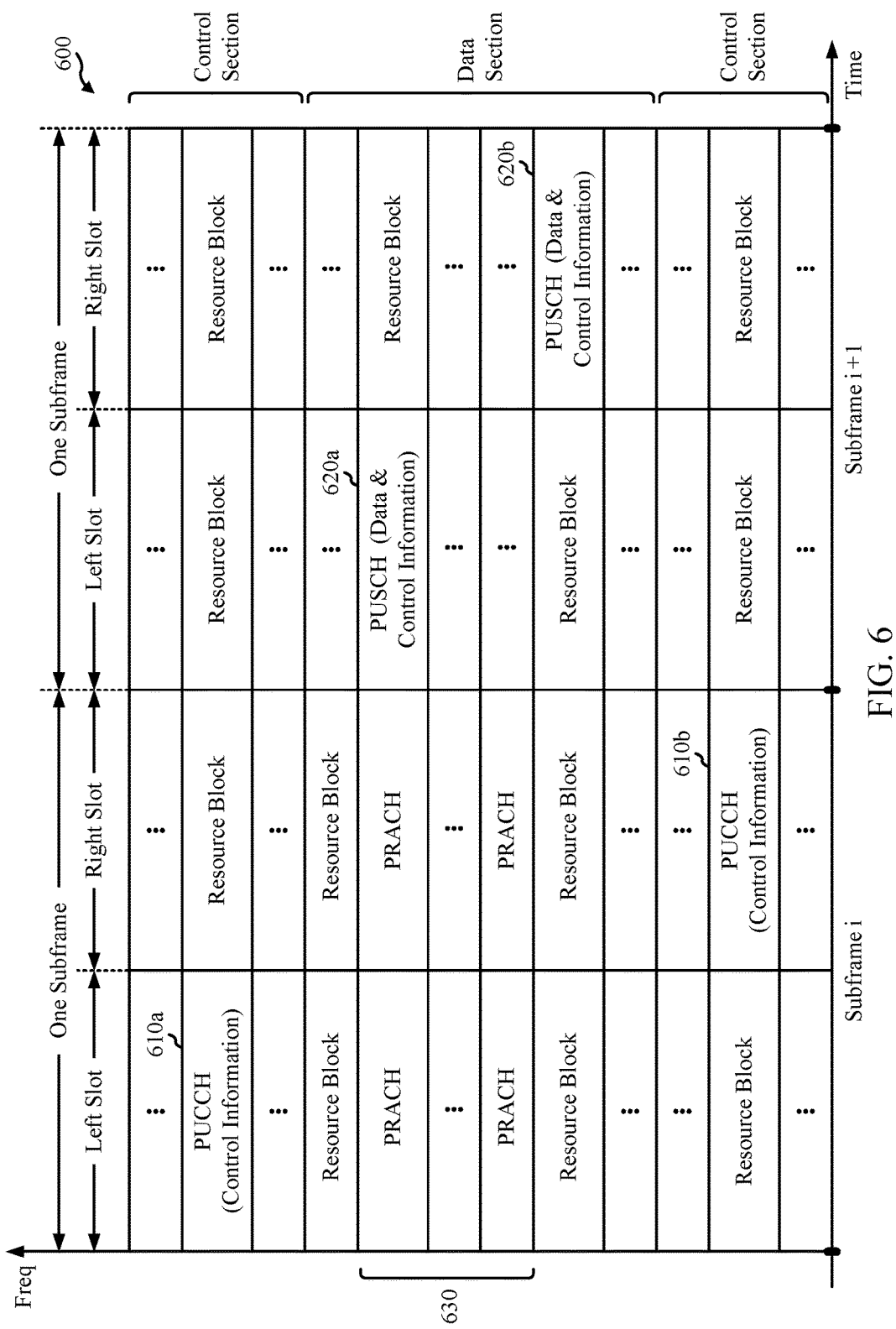
FIG. 6 is a diagram illustrating an example uplink frame structure in a telecommunications system, according to aspects of the present disclosure.

FIG. 6 is a diagram 600 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 610a, 610b in the control section to transmit control information to a Node B. The UE may also be assigned resource blocks 620a, 620b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 630. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Example New Radio

New radio (NR) may refer to radios configured to operate according a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access node controller (ANC). The CU terminates backhaul interface to RAN-CN, terminates backhaul interface to neighbor RAN node. The RAN may include a Distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Example Power Saving Scheme

Certain wireless communication systems, such as LTE Advanced (LTE-A) may support carrier aggregation of two or more UL channels. A UE 120 may include a power amplifier 316 to provide high transmit power for an output RF signal. For example, the PA may amplify the RF signal to a desired level for transmission. A UE may save battery power if all transmit chains at the UE operate in an envelope tracking (ET) mode. To operate in an ET mode for UL carrier aggregation, the UE may use a separate ET DAC for a transmit chain associated with each UL carrier.

Accordingly, implementing ET for each transmit chain may be costly in terms of UE hardware and bill of material (BOM) costs because, for example, an additional ET DAC may be paired to control a switched mode power supply (SMPS) to a PA. Accordingly, lost-cost or "value-tier" UEs may not be configured to operate in an ET mode for each or any transmit chain. Instead of ET, such UEs may perform another, less efficient power saving technique, which may not require additional hardware and/or as much footprint.

xPT is a generic term which may include power saving techniques that may be practiced by a UE. As will be described in more detail herein, examples of the power saving techniques may include Average Power Tracking (APT), or Enhanced Power Tracking (EPT), and Envelope Tracking (ET).

Figure 7:
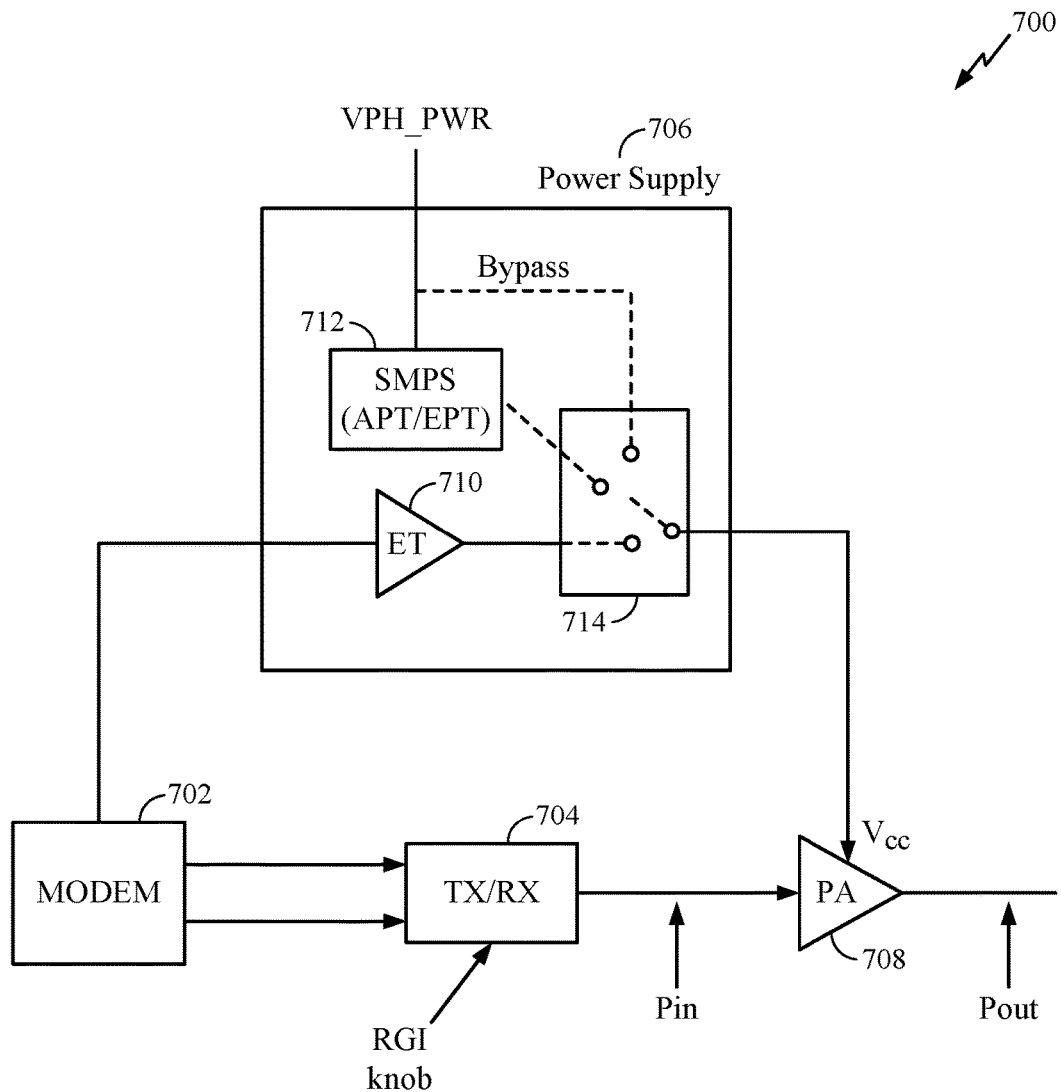
FIG. 7 illustrates an example a transmit chain at a UE, according to aspects of the present disclosure.

FIG. 7 illustrates an example 700 a transmit chain at a UE according to aspects of the present disclosure. The UE may have a modem 702. From the modem 702, the UE may have a first transmit path to a transceiver 704 and a second path from the modem 702 to the power supply 706. The power supply 706 may control the bias to the PA 708. The power tracking logic 710 may serve as part of the power supply 706. The power tracking logic may 710 include ET DAC circuity. In aspects, the ET DAC may be used to control a SMPS 712, in an effort to perform APT or EPT. The switch 714 in the power supply 706 may allow a UE to operate in a bypass mode, APT mode, EPT mode or ET mode. In aspects, the power tracking 710 may be borrowed logic (e.g., transmit logic) from a second transmit chain of the UE as described herein.

Figure 8:
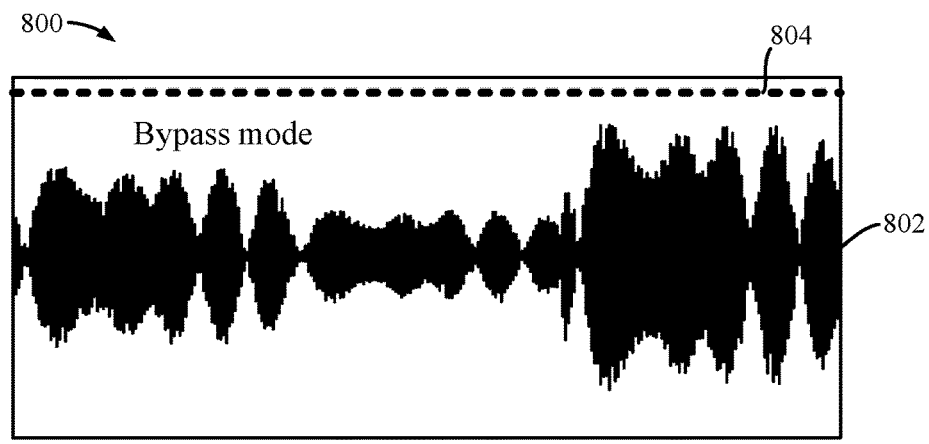
FIG. 8 illustrates an example bypass mode of operation, according to aspects of the present disclosure.

FIG. 8 illustrates an example bypass mode of operation 800. While operating in a bypass mode, the UE may not apply an efficient bias to the PA. For example, the battery voltage may be directly provided as a fixed power amplifier supply voltage for the power amplifier to amplify an upconverted RF signal. Since the power amplifier supply voltage must be greater than the signal peaks of the RF signal to be amplified, to avoid clipping, the battery voltage of the UE in bypass mode may be a constant high value. As a result, excess current may be drawn in the power amplifier and dissipated as wasted energy when the PA operates in a bypass mode. As illustrated in FIG. 7, in a bypass mode, the SMPS 712 may not be used to supply power to the PA.

Referring back to FIG. 8, 802 represents the envelope of the signal (e.g., LTE signal) to be amplified. 804 represents the bias applied to the PA. The bias 804 applied to the PA may be a constant, high value (e.g., relative to the envelope of the signal to be amplified 804). Accordingly, a bypass mode may provide little or no reduction in the power consumed by the PA and may have some non-linearity, which may result in wasted power.

Figure 9:
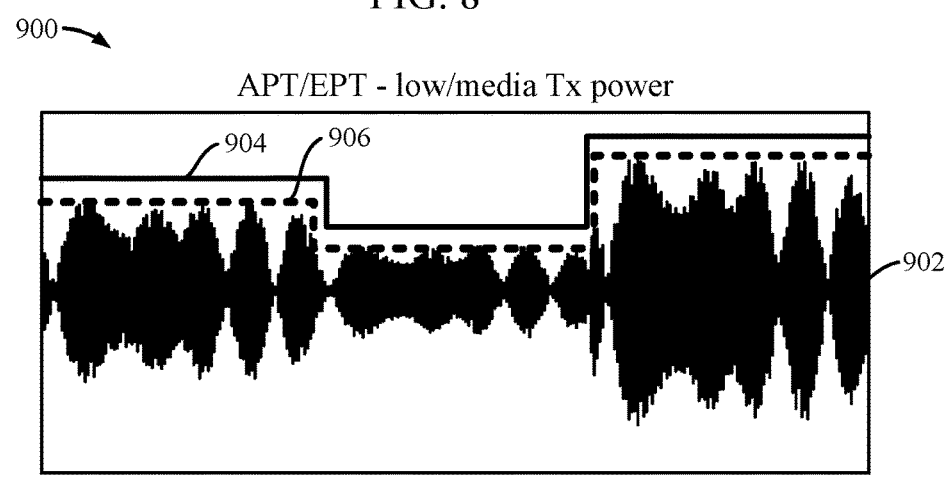
FIG. 9 illustrates an example APT and/or EPT mode of operation, according to aspects of the present disclosure.

FIG. 9 illustrates an example APT and EPT mode of operation 900. APT and EPT may reduce power wastage by the power amplifier, as compared to the bypass mode. In the APT mode, the supply voltage to the power amplifier may be adjusted based on the average transmit power of the signal to be amplified. In this manner, the supply voltage to the power amplifier may cause the power amplifier to operate close to the compression point, thereby improving efficiency. 902 represent the envelope of the signal to be amplified. During an APT mode of operation, the PA operates in linear mode of operation, with the bias 904 to the PA varying as a function of transmit power. According to aspects, the bias 904 may represent the bias required to have the PA operate in a linear region.

The EPT mode may further reduce power wastage and increase efficiency of the power amplifier compared to the APT mode. Operations in the EPT mode may also involve adjusting the power amplifier supply voltage based on average transmit power of the RF signal to be amplified, similar to in APT mode; however, in the EPT mode the power amplifier supply voltage is reduced to below the compression point of the power amplifier. This may cause a loss of linearity at the PA. The EPT mode operation adjusts for this distortion/non-linearity using digital pre-distortion. According to aspects, the bias 906 may represent the bias when the UE is operating in an EPT mode. In an EPT mode, the UE may operate in a compressed mode and the linearity may be corrected by applying digital pre-distortion. The bias 906 may represent more conservation of power by the UE operating in an EPT mode as compared to the UE operating in an APT mode.

Figure 10:
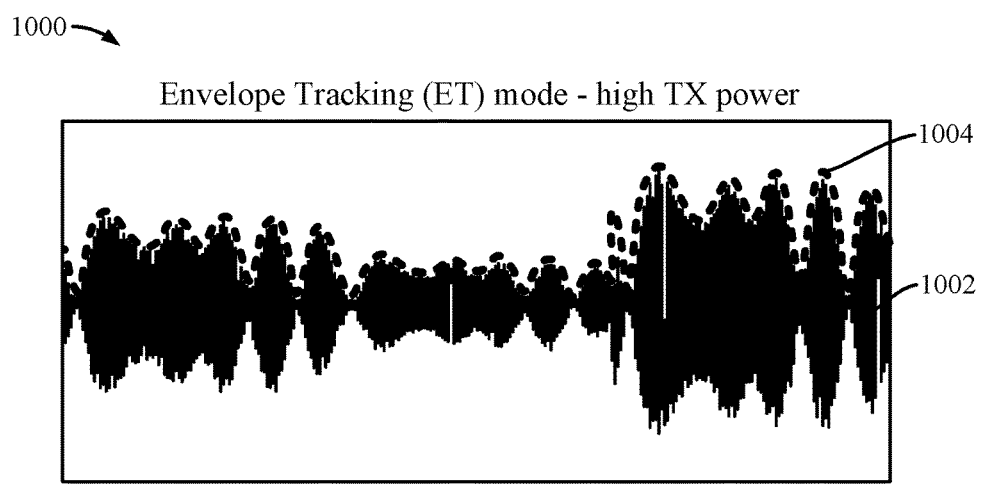
FIG. 10 illustrates an example ET mode of operation, according to aspects of the present disclosure

FIG. 10 illustrates an example ET mode of operation 1000, according to aspects of the present disclosure. Operations in the ET mode may save more power than each of the bypass mode, APT mode, and EPT mode. The ET mode may use the envelope of the signal to be amplified to control the supply voltage to the PA. 1002 may represent the envelope of the signal to be amplified. 1004 may represent the bias to the PA, which, as illustrated in FIG. 10, closely tracks the envelope of the signal to be transmitted 1002.

Operations in the ET mode may involve converting the envelope of the signal to be amplified into an analog signal, in an effort to ensure the power amplifier supply voltage may closely track the signal to be amplified. A DAC and corresponding DAC logic at the UE may perform this conversion. Accordingly, a UE may include an additional DAC (e.g., ET DAC, which may be part of ET logic) in order to perform ET transmission.

According to current implementations, in an effort to perform ET transmissions, UE having a single modem with two transmit chains may have two PAs. Each PA may be powered by a respective power supply. Accordingly, each transmit chain may have its own ET logic and corresponding hardware to perform ET UL transmission. As described above, the additional ET hardware which may include an ET DAC may increase footprint and BOM costs.

In an effort to reduce footprint at a UE and reduce BOM costs while still saving power at a UE, aspects of the present disclosure identify one or more subframes in which a transmit chain is not scheduled for UL transmissions. During at least a portion of the identified subframe, the UE may opportunistically repurpose one or more portions of the unused transmit chain for performing ET for a scheduled transmit chain.

As an example, a UE may comprise a first and second transmit chain. Each of the transmit chains may include transmit logic. The transmit logic may include a DAC and corresponding logic. In aspects, the first transmit chain has APT/EPT logic, while the second transmit chain may not have APT/EPT logic but may have transmit logic (e.g., a transmit DAC). Upon identifying one or more subframes in which a second transmit chain is not scheduled for uplink transmission, the UE may repurpose portions of the second transmit chain (e.g., a transmit DAC) to perform ET uplink transmission for scheduled UL transmissions on the first transmit chain.

For example, the UE may use the first transmit chain and the DAC associated with the second transmit chain to perform ET of an uplink transmission using the first transmit chain. In manner, the DAC 710 associated with an unscheduled, second transmit chain may be used or serve as an ET DAC by the UE during one or more subframes in which the first transmit chain is scheduled for transmission. Accordingly, without additional hardware, at least in certain subframes, the UE may realize increased power savings by operating in an ET mode, as opposed to a bypass mode or another power saving mode such as an APT mode or EPT mode.

FIG. 11 illustrates example operations 1100, which may be performed by a UE according to aspects of the present disclosure. The UE may have a first and second transmit chain. For example, the UE may have two transmit paths. Each of the two transmit paths may include ET logic. In aspects, the first transmit chain has APT/EPT logic, while the second transmit chain may not have APT/EPT logic but may have transmit logic (e.g., a transmit DAC).

The UE 120 may include one or more components illustrated in FIGS. 2, 3, and 7. For example, one or more of the antenna 252, 303, transceiver front end 254, 306, controller 280, memory 282, DAC 308, and/or ET logic 710 may be configured to perform the operations described herein. As described above, each of the transmit chains 302 may include ET logic, such as a DAC and corresponding logic. In aspects, the first transmit chain has APT/EPT logic, while the second transmit chain may not have APT/EPT logic but may have transmit logic (e.g., a transmit DAC).

At 1102, the UE may identify one or more subframes in which the second transmit chain is not scheduled for uplink transmissions. For example, the UE may not be scheduled for UL transmission to a second cell during the one or more subframes.

As will be described in more detail herein, the identified one or more subframes may occur when the UE is operating in at least one of a connected discontinuous reception (CDRx) mode or a time division duplex (TDD) mode on the second cell. According to aspects, the identified one or more subframes may occur when the UE is configured for UL carrier aggregation (CA).

At 1104, the UE may determine the first transmit chain is scheduled for UL transmissions during at least a portion of the identified subframes. For example, the UE may be scheduled for UL transmission to a first cell during at least a portion of the identified subframes in which the UE is not scheduled for UL transmission on the second cell.

At 1106, the UE may perform ET for a scheduled uplink transmission using, at least, a portion of the first and second transmit chains during the determined portions of the identified subframes. The UE may opportunistically repurpose at least a portion of the unused, second transmit chain, to perform ET UL on one or more transmissions on the first cell.

Figure 12:
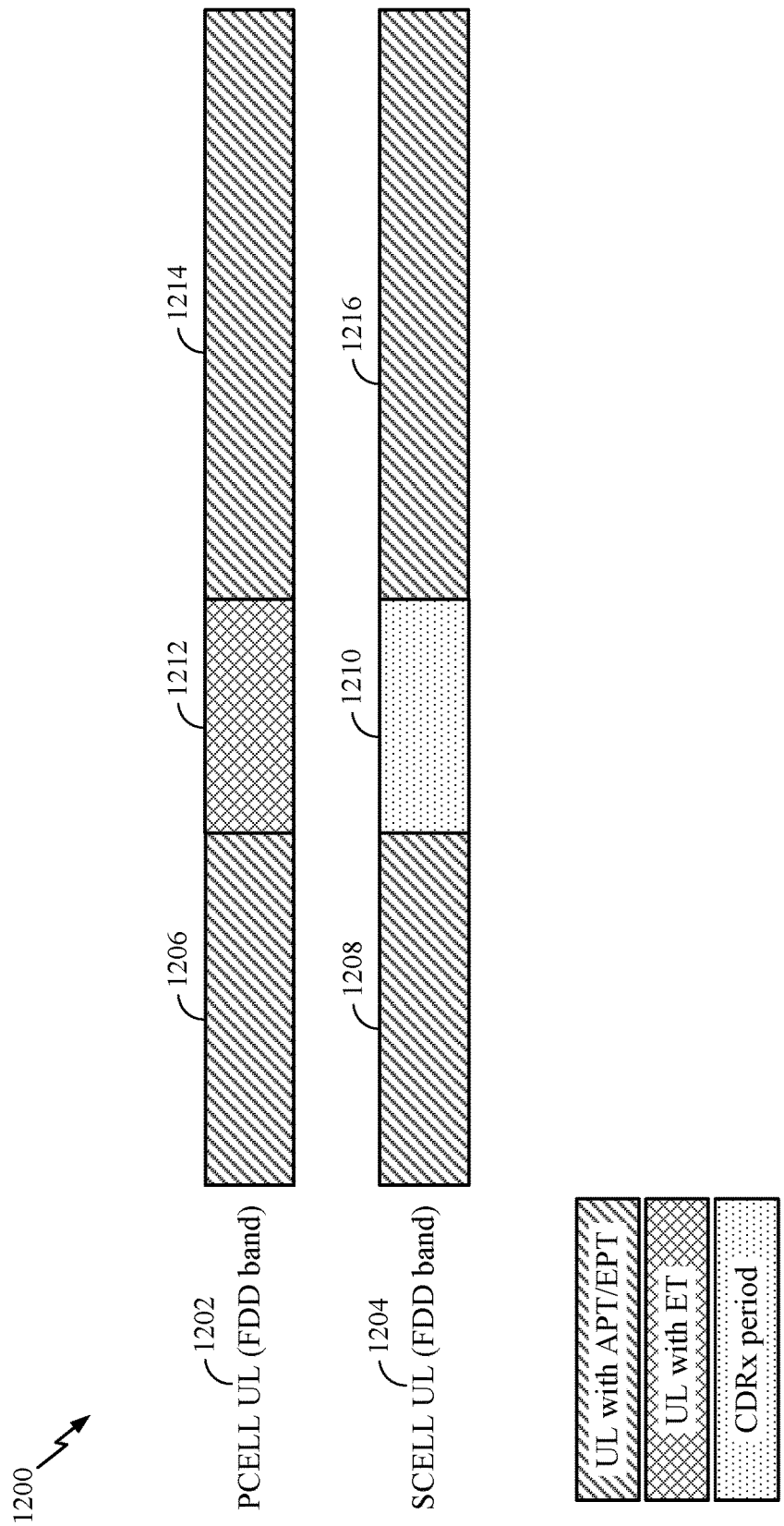
FIG. 12 illustrates an example scenario where a UE may operate in a smart power saving scheme, according to aspects of the present disclosure.

FIG. 12 illustrates an example scenario 1200 where a UE may operate in a smart power saving scheme, according to aspects of the present disclosure. According to aspects, a UE may be configured for uplink CA. Opportunities may exist when one or more cells are operating in a discontinuous transmission/reception mode. For example, one or more carriers may be in a periodic connected discontinuous reception (CDRx) mode, for example, based on uplink and downlink data activity.

Accordingly, in certain frames, a DAC associated with one of the transmit chains at the UE may not be in use while another transmit chain at the UE is scheduled for UL transmission. The DAC associated with the unscheduled transmit chain may, advantageously, be used for ET transmission to a scheduled cell.

With reference to FIG. 12, a UE may be configured for UL CA using two frequency division duplex (FDD) bands 1202, 1204. The band 1202 may be used by a primary cell (PCell) and band 1204 may be used by a secondary cell (SCell). The UE may be in a connected state with both the PCell and SCell. The UE may perform UL transmission to the PCell at 1206 while performing UL transmission to the SCell at 1208. The UL transmissions 1206 and 1208 may represent one or more frames in which the UE is continuously transmitting, for example, using a power saving method such as APT or EPT.

1210 represents one or more frames in which the UE is not scheduled for UL transmission on the SCell 1204. The UE may be in a connected discontinuous reception (CDRx) gap. During a CDRx gap, data transfer between the UE and the SCell may not be occurring. Thus, the UE may not transmitting to the SCell during a CDRx gap. As an example, the UE may be a CDRx gap for up to 200 milliseconds.

During this time, or a portion of this time, the UE may perform ET on one or more uplink transmissions on the PCell, using at least a portion of the unused transmit chain associated with the SCell. Thus, as 1212, the UE may perform ET on one or more uplink transmissions using portions of the first and second transmit chains while communicating on to the PCell. Thereafter, at 1216, when the UE is scheduled for UL transmissions on the SCell, the UE may stop performing ET on one or more transmissions on the PCell. According to aspects, the UE may revert back to another power saving mode, such as, for example APT or EPT. Thus, the UE may perform UL transmissions to the PCell at 1214 while performing UL transmissions to the SCell at 1216.

Thus, as illustrated in FIG. 12, a UE may be configured to use a first transmit chain for communicating with a first cell (PCell) over a first FDD band and configured to use a second transmit chain for communicating with a second cell (SCell) over a second FDD band. The UE may identify at least one frame in which the UE is not scheduled for UL transmission over the second FDD band. In response, the UE may perform ET on one or more uplink transmissions using at least a portion of the second transmit chain for performing ET for the scheduled UL transmission to the first cell over the first FDD band in the determined at least one frame.

Figure 13:
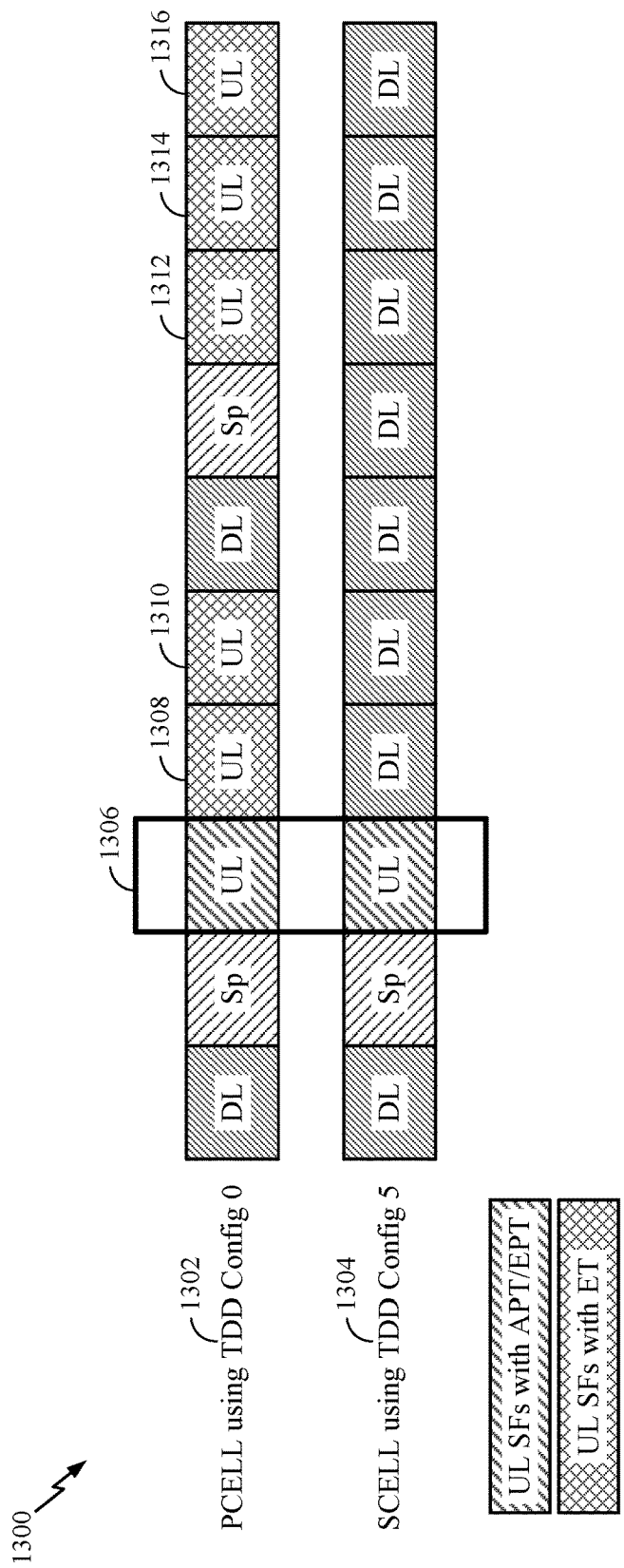
FIG. 13 illustrates an example scenario where a UE may operate in a smart power saving scheme, according to aspects of the present disclosure.

FIG. 13 illustrates an example scenario 1300 where a UE may operate in a smart power saving scheme, according to aspects of the present disclosure. A UE may be configured to operate in a TDD mode. By its nature, TDD may have discontinuous transmission periods. Accordingly, when the UE is configured for UL CA with cells having TDD bands (TDD+TDD CA), opportunities may arise where portions of an unscheduled transmit chain may be repurposed to perform ET for scheduled UL transmissions. Similarly, as will be described with reference to FIG. 14, a UE may be configured for UL CA for FDD band on a first cell and TDD on a second cell (FDD+TDD CA), opportunities may arise where portions of an unscheduled transmit chain may be repurposed to perform ET for scheduled UL transmissions.

FIG. 13 illustrates a scenario where a UE is configured for UL CA with two TDD bands. A first TDD band 1302 may be used in a PCell and a second TDD band 1304 may be used in a SCell. For exemplary purposes only, the PCell may use TDD UL/DL configuration 0 and the SCell may use TDD UL/DL configuration 5. According to configuration 0, there may be 6 UL subframes per frame on the PCell. Accordingly to configuration 5, there may be one UL subframe per frame on the SCell.

In subframe 1306, the UE is scheduled for UL transmission on both the PCell and SCell. The UE may perform power saving using one of APT or EPT. During the remaining 5 subframes 1308-1316 scheduled for UL transmission by the UE on the PCell, the UE may perform ET using at least a portion of the unused transmit chain associated with the SCell. For example, during at least a portion of subframes 1308-1316, the transmit chain associated with the SCell may not be used, as the UE is scheduled for DL transmission. According to aspects of the present disclosure, the UE may repurpose an unused portions of the second transmit chain, such as the transmit logic including a DAC, to perform ET on one or more UL transmissions on subframes 1308-1316.

Thus, as illustrated in FIG. 13, the UE may be configured to use a first transmit chain to communicate with a first cell (e.g., PCell) using a first TDD configuration and may be configured to use a second transmit chain to communicate with a second cell (e.g., SCell) using a second TDD configuration. The UE may identify one or more subframes in which (1) the second transmit chain is not scheduled for UL transmission based on the second TDD configuration and in which (2) the first transmit chain is scheduled for UL transmission based on the first TDD configuration. In response, the UE may perform ET on one or more uplink transmissions using at least a portion of the second transmit chain for the scheduled UL transmission to the first cell in the identified at least one subframe.

Figure 14:
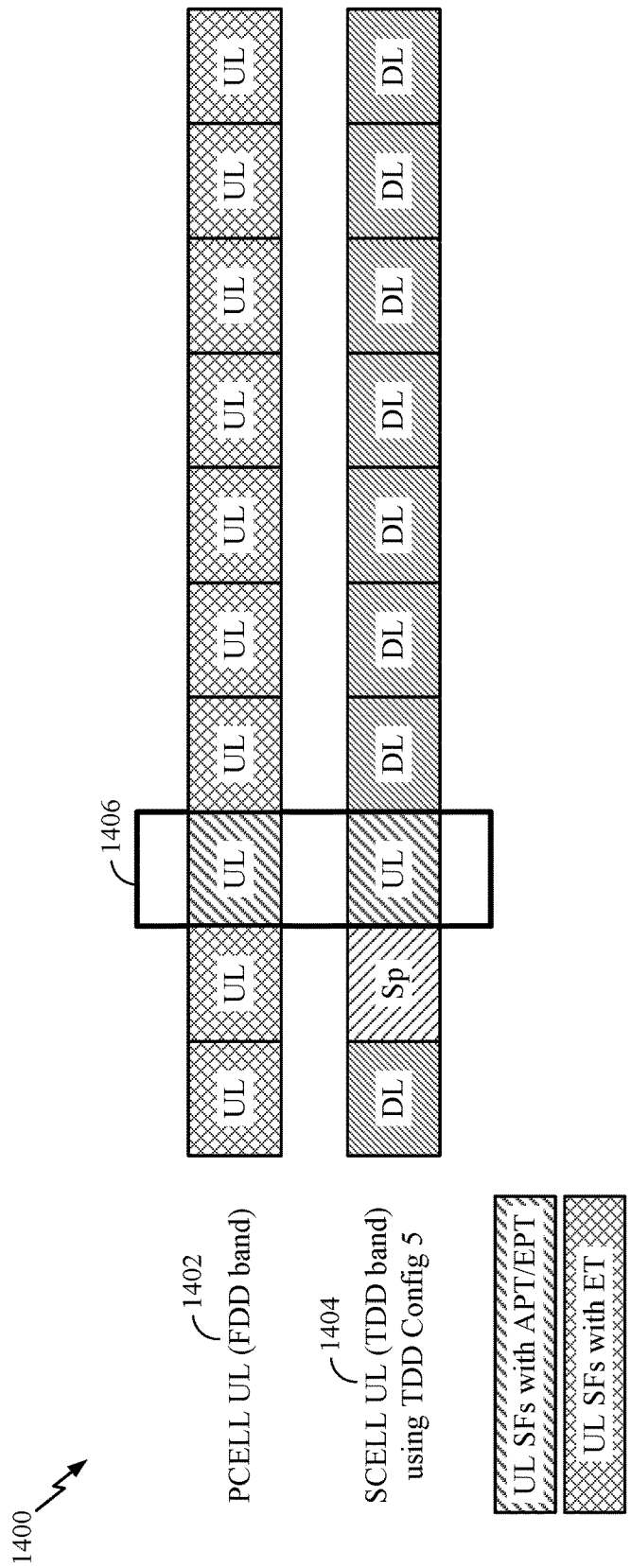
FIG. 14 illustrates an example scenario where a UE may operate in a smart power saving scheme, according to aspects of the present disclosure To facilitate understanding, identical reference numerals have been used, where possible, to designate identical elements that are common to the figures. It is contemplated that elements disclosed in one aspect may be beneficially utilized on other aspects without specific recitation.

FIG. 14 illustrates an example scenario 1400 where a UE may operate in a smart power saving scheme, according to aspects of the present disclosure. As illustrated in FIG. 14, a UE may be configured for UL CA with one FDD band on a first cell and TDD on a second cell. Using a PCell 1402, the UE may transmit on a FDD band continuously. For illustrative purposes only, the SCell 1404 may be configured to use a TDD UL/DL configuration 5. Configuration 5 may have only one UL subframe per frame, as illustrated at 1406. The remaining subframes of configuration 5 may be scheduled for DL reception and/or may be a special subframe (Sp). Accordingly, the UE may opportunistically transmit in an ET mode via the PCell during, at least, a portion of the remaining 9 subframes.

Thus, as illustrated in FIG. 14, a UE may be configured to use a first transmit chain to communicate with a first cell (e.g., PCell) over a first FDD band and may be configured to use a second transmit chain to communicate with a second cell (e.g., SCell) using a first TDD configuration. The UE may identify at least one subframe in which (1) the second transmit chain is not scheduled for UL transmission based on the first TDD configuration (e.g., TDD UL/DL configuration) and in which (2) the first transmit chain is scheduled for UL transmission over the first FDD band. In response, the UE may perform ET on one or more uplink transmissions for the scheduled UL transmission to the first cell in the identified at least one subframe using at least a portion of the second, unscheduled transmit chain.

Aspects described herein may advantageously be used for smart power saving by a UE. The UE may opportunistically use transmit logic associated with a transmit chain not scheduled for UL transmissions for performing ET on one or more a transmit chain that is scheduled for UL transmissions. The UE may opportunistically operate in an ET mode even though one or more of the chains in the UE may not have its own, dedicated ET DAC. Accordingly, the UE may increase power savings without increasing the footprint and bill of material cost.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. According to aspects, one or more of the components illustrated in FIGS. 2, 3, 4, and 7 may be configured to perform the recited means for identifying, means for determining, and means for performing ET.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product and/or a computer readable medium.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal (UE) and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE) comprising at least a first and second transmit chain, comprising:
    identifying one or more subframes in which the second transmit chain is not scheduled for uplink (UL) transmissions;
    determining the first transmit chain is scheduled for UL transmissions during at least a portion of the identified subframes; and
    performing envelope tracking (ET) for a scheduled uplink transmission using, at least a portion of the first and second transmit chains during the determined at least a portion of the identified subframes, wherein performing the ET comprises adjusting a voltage supplied to a power amplifier (PA) of the UE based, at least in part, on an envelope of a signal to be amplified by the PA.

2. The method of claim 1, wherein the identified one or more subframes occur when the UE is operating in at least one of a connected discontinuous reception (CDRx) mode or a time division duplex (TDD) mode.

3. The method of claim 1, wherein the identified one or more subframes occur when the UE is configured for UL carrier aggregation (CA).

4. The method of claim 1, wherein each of the first and second transmit chains comprises transmit logic.

5. The method of claim 4, wherein the transmit logic comprises digital-to-analog converter (DAC) logic.

6. The method of claim 1,
    wherein the UE is configured to use the first transmit chain for communicating with a first cell over a first frequency division duplex (FDD) band and configured to use the second transmit chain for communicating with a second cell over a second FDD band,
    wherein the identifying comprises identifying a frame in which the UE is not scheduled for UL transmission over the second FDD band, and
    wherein performing the ET uplink transmissions comprises using at least a portion of the second transmit chain for performing ET for the scheduled UL transmission to the first cell over the first FDD band in the determined frame.

7. The method of claim 6, wherein identifying the frame in which the UE is not scheduled for UL transmission over the second FDD band comprises:
    determining a periodic connected discontinuous reception (CDRx) gap is scheduled for the frame.

8. The method of claim 1,
    wherein the UE is configured to use the first transmit chain to communicate with a first cell using a first time division duplex (TDD) configuration and configured to use the second transmit chain to communicate with a second cell using a second TDD configuration,
    wherein identifying the one or more subframes comprises identifying at least one subframe in which the second transmit chain is not scheduled for UL transmission based on the second TDD configuration and in which the first transmit chain is scheduled for UL transmission based on the first TDD configuration, and wherein performing the ET uplink transmissions comprises using at least a portion of the second transmit chain for performing ET for the scheduled UL transmission to the first cell in the identified at least one subframe.

9. The method of claim 1, wherein the UE is configured to use the first transmit chain to communicate with a first cell over a first frequency division duplex (FDD) band and configured to use the second transmit chain to communicate with a second cell using a first time division duplex (TDD) configuration, wherein identifying the one or more subframes comprises identifying the at least one subframe in which the second transmit chain is not scheduled for UL transmission based on the first TDD configuration and in which the first transmit chain is scheduled for UL transmission over the first FDD band, and wherein performing the ET uplink transmissions comprises using at least a portion the second transmit chain for performing ET for the scheduled UL transmission to the first cell in the identified at least one subframe.

10. The method of claim 1, wherein the UE is configured to communicate with a first cell using the first transmit chain and configured to communicate with a second cell using the second transmit chain, and after performing the ET uplink transmissions, further comprising:

determining the UE is scheduled for UL transmission to the second cell; and in response to the determination, using the second transmit chain for UL transmission to the second cell.

11. An apparatus wireless communication by a user equipment (UE) comprising at least a first and second transmit chain, comprising:

means for identifying one or more subframes in which the second transmit chain is not scheduled for uplink (UL) transmissions;

means for determining the first transmit chain is scheduled for UL transmissions during at least a portion of the identified subframes; and means for performing envelope tracking (ET) for a scheduled uplink transmission using, at least a portion of the first and second transmit chains during the determined at least a portion of the identified subframes, wherein performing the ET comprises adjusting a voltage supplied to a power amplifier (PA) of the UE based, at least in part, on an envelope of a signal to be amplified by the PA.

12. The apparatus of claim 11, wherein the identified one or more subframes occur when the UE is operating in at least one of a connected discontinuous reception (CDRx) mode or a time division duplex (TDD) mode.

13. The apparatus of claim 11, wherein the identified one or more subframes occur when the UE is configured for UL carrier aggregation (CA).

14. The apparatus of claim 13, wherein each of the first and second transmit chains comprises transmit logic.

15. The apparatus of claim 14, wherein the transmit logic comprises digital-to-analog converter (DAC) logic.

16. The apparatus of claim 11, wherein the UE is configured to use the first transmit chain for communicating with a first cell over a first frequency division duplex (FDD) band and configured to use the second transmit chain for communicating with a second cell over a second FDD band, wherein the means for identifying comprises means for identifying a frame in which the UE is not scheduled for UL transmission over the second FDD band, and wherein the means for performing the ET uplink transmissions comprises means for using at least a portion of the second transmit chain for performing ET for the scheduled UL transmission to the first cell over the first FDD band in the determined frame.

17. The apparatus of claim 16, wherein the means for identifying the frame in which the UE is not scheduled for UL transmission over the second FDD band comprises:

means for determining a periodic connected discontinuous reception (CDRx) gap is scheduled for the frame.

18. The apparatus of claim 11, wherein the UE is configured to use the first transmit chain to communicate with a first cell using a first time division duplex (TDD) configuration and configured to use the second transmit chain to communicate with a second cell using a second TDD configuration, wherein the means for identifying the one or more subframes comprises means for identifying at least one subframe in which the second transmit chain is not scheduled for UL transmission based on the second TDD configuration and in which the first transmit chain is scheduled for UL transmission based on the first TDD configuration, and wherein the means for performing the ET uplink transmissions comprises means for using at least a portion of the second transmit chain for performing ET for the scheduled UL transmission to the first cell in the identified at least one subframe.

19. The apparatus of claim 11, wherein the UE is configured to use the first transmit chain to communicate with a first cell over a first frequency division duplex (FDD) band and configured to use the second transmit chain to communicate with a second cell using a first time division duplex (TDD) configuration, wherein the means for identifying the one or more subframes comprises means for identifying the at least one subframe in which the second transmit chain is not scheduled for UL transmission based on the first TDD configuration and in which the first transmit chain is scheduled for UL transmission over the first FDD band, and wherein the means for performing the ET uplink transmissions comprises means for using at least a portion the second transmit chain for performing ET for the scheduled UL transmission to the first cell in the identified at least one subframe.

20. The apparatus of claim 11, wherein the UE is configured to communicate with a first cell using the first transmit chain and configured to communicate with a second cell using the second transmit chain, and after performing the ET uplink transmissions, further comprising:

means for determining the UE is scheduled for UL transmission to the second cell; and in response to the determination, means for using the second transmit chain for UL transmission to the second cell.

21. An apparatus wireless communication by a user equipment (UE) comprising at least a first and second transmit chain, at least one processor, and memory coupled to the at least one processor, wherein the at least one processor is configured to:
  identify one or more subframes in which the second transmit chain is not scheduled for uplink (UL) transmissions;
  determine the first transmit chain is scheduled for UL transmissions during at least a portion of the identified subframes; and
  perform envelope tracking (ET) for a scheduled uplink transmission using, at least a portion of the first and second transmit chains during the determined at least a portion of the identified subframes, wherein performing the ET comprises adjusting a voltage supplied to a power amplifier (PA) of the UE based, at least in part, on an envelope of a signal to be amplified by the PA.

22. The apparatus of claim 21, wherein the identified one or more subframes occur when the UE is operating in at least one of a connected discontinuous reception (CDRx) mode or a time division duplex (TDD) mode.

23. The apparatus of claim 21, wherein the identified one or more subframes occur when the UE is configured for UL carrier aggregation (CA).

24. The apparatus of claim 23, wherein each of the first and second transmit chains comprises transmit logic and wherein the transmit logic comprises digital-to-analog converter (DAC) logic.

25. The apparatus of claim 21,
  wherein the UE is configured to use the first transmit chain for communicating with a first cell over a first frequency division duplex (FDD) band and configured to use the second transmit chain for communicating with a second cell over a second FDD band,
  wherein the at least one processor is configured to identify the one or more subframes by identifying a frame in which the UE is not scheduled for UL transmission over the second FDD band, and
  wherein the at least one processor is configured to perform the ET uplink transmissions by using at least a portion of the second transmit chain for performing ET for the scheduled UL transmission to the first cell over the first FDD band in the determined frame.

26. The apparatus of claim 25, wherein the at least one processor is configured to:
  determine a periodic connected discontinuous reception (CDRx) gap is scheduled for the frame, and
  wherein the at least one processor is configured to identify identify the frame in which the UE is not scheduled for UL transmission over the second FDD based, at least in part, on the CDRx gap.

27. The apparatus of claim 21,
  wherein the UE is configured to use the first transmit chain to communicate with a first cell using a first time division duplex (TDD) configuration and configured to use the second transmit chain to communicate with a second cell using a second TDD configuration,
  wherein the at least one processor is configured to identify the one or more subframes by identifying at least one subframe in which the second transmit chain is not scheduled for UL transmission based on the second TDD configuration and in which the first transmit chain is scheduled for UL transmission based on the first TDD configuration, and
  wherein the at least one processor is configured to perform the ET uplink transmissions by using at least a portion of the second transmit chain for performing ET for the scheduled UL transmission to the first cell in the identified at least one subframe.

28. The apparatus of claim 21,
  wherein the UE is configured to use the first transmit chain to communicate with a first cell over a first frequency division duplex (FDD) band and configured to use the second transmit chain to communicate with a second cell using a first time division duplex (TDD) configuration,
  wherein the at least one processor is configured to identifying the one or more subframes by identifying the at least one subframe in which the second transmit chain is not scheduled for UL transmission based on the first TDD configuration and in which the first transmit chain is scheduled for UL transmission over the first FDD band, and
  wherein the at least one processor is configured to perform the ET uplink transmissions by using at least a portion the second transmit chain for performing ET for the scheduled UL transmission to the first cell in the identified at least one subframe.

29. The apparatus of claim 21,
  wherein the UE is configured to communicate with a first cell using the first transmit chain and configured to communicate with a second cell using the second transmit chain, and after performing the ET uplink transmissions, and the at least one processor is further configured to:
  determine the UE is scheduled for UL transmission to the second cell; and
  in response to the determination, use the second transmit chain for UL transmission to the second cell.

30. A non-transitory computer readable medium for wireless communication by a first user equipment (UE) comprising least a first and second transmit chain, having instructions stored thereon for:
  identifying one or more subframes in which the second transmit chain is not scheduled for uplink (UL) transmissions;
  determining the first transmit chain is scheduled for UL transmissions during at least a portion of the identified subframes; and
  performing envelope tracking (ET) for a scheduled uplink transmission using, at least a portion of the first and second transmit chains during the determined at least a portion of the identified subframes, wherein performing the ET comprises adjusting a voltage supplied to a power amplifier (PA) of the UE based, at least in part, on an envelope of a signal to be amplified by the PA.

* * * * *